(No Model.)
J. L. ALLEN.
BICYCLE BRAKE.
No. 606,496. Patented June 28, 1898.
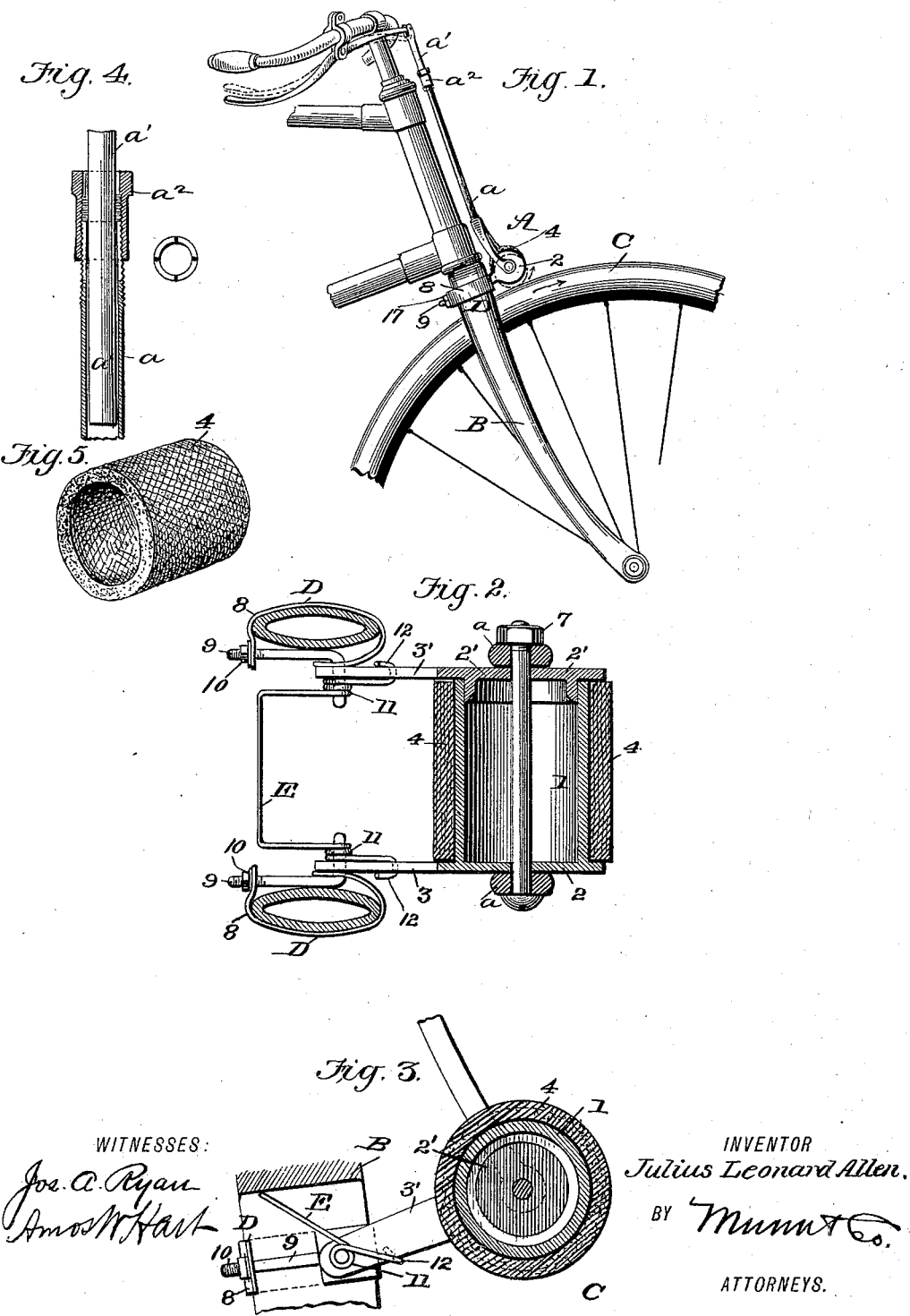
WITNESSES:
Jos. A. Ryan
Amos W. Hart
INVENTOR
Julius Leonard Allen.
BY Munn & Co.
ATTORNEYS.

UNITED STATES PATENT OFFICE.

JULIUS LEONARD ALLEN, OF MENDOCINO, CALIFORNIA.

BICYCLE-BRAKE.

SPECIFICATION forming part of Letters Patent No. 606,496, dated June 28, 1898.

Application filed December 10, 1896. Serial No. 615,162. (No model.)

*To all whom it may concern:*

Be it known that I, JULIUS LEONARD ALLEN, of Mendocino, in the county of Mendocino and State of California, have invented a new and useful Improvement in Bicycle-Brakes, of which the following is a specification.

My invention is an improvement in the class of brakes for bicycles in which a loose band or sleeve revolves free around a rigid drum or axle which may be adjusted to bring it into or remove it from contact with the tire of the wheel.

The invention is embodied in the construction and combination of parts hereinafter described.

In the accompanying drawings, Figure 1 is a side view showing the arrangement of my improved brake in connection with a bicycle front wheel. Fig. 2 is a horizontal section showing the parts enlarged to normal size. Fig. 3 is a vertical section of the same. Fig. 4 is a longitudinal section of means for connecting the brake proper with the hand-lever for operating it. Fig. 5 is a perspective view of the revoluble brake-band detached.

As shown in Fig. 1, my improved brake A is attached to the fork B of a bicycle, in front of the same, and thus adapted to be pressed down into contact with the elastic tire C of the front wheel. The means for effecting depression consist of a forked tube $a$, that is connected adjustably with the ordinary brake-lever by means of a rod $a'$, as hereinafter described.

The brake proper is composed of the following parts, namely: a non-rotatable metal drum or cylinder I, Figs. 1 and 2, constructed integrally with a circular or disk-like head 2, having a radial arm 3, a detachable head 2', having a similar arm 3', and the band 4, that fits somewhat loosely on the cylinder 1 and is thus adapted to revolve thereon when brought into contact with the tire C.

A threaded bolt or rod passes through holes in the center of the heads 2 2', also through the forks of the brake-tube $a$, and a nut 7 is applied to one end of the same for holding the parts 1 2 2' engaged or clamped together.

The arms 3 3' of the fixed cylinder-heads 2 2' are pivotally connected with the fork B by means of detachable clamps D. Said clamps are composed of an elastic band 8 and angular tie-bolt 9. The said band 8 is adapted to embrace one of the arms of the fork B, and the bolt 9 is passed through holes in the ends of the same. One end of the bolt is bent at a right angle and the other is screw-threaded to receive a nut 17, by which the clamp may be tightened on the fork. The angular ends of the opposite bolts project inward horizontally from the arms of the fork B and serve as pivots for the arms 3 3' of the non-rotatable cylinder. Thus the bolts subserve two functions.

As a means for elastically supporting the cylinder normally out of contact with the tire C, I employ a spring E, which is peculiarly constructed and arranged—that is to say, it is formed of spring-wire, which is bent into a sort of loop whose parallel arms are bent or curved to form eyes 11 and their ends to form hooks 12. When this device is applied, the hooks 12 engage the arms 3 3' of the brake-heads, and the eyes 11 receive the pintles or ends of the clamp-bolts 9, while the loop or closed end of the spring bears upward against the crotch of the fork B. Thus the spring is virtually used as an elastic lever which supports the brake and its attachments save when depressed by the manual application of due force to the brake-lever. When the cylinder is thus depressed, as shown by dotted lines, Fig. 1, the revoluble band 4 comes in contact with the wheel-tire C, and as the latter rotates its friction with such band 4 rotates the latter on the smooth body 1 of the cylinder. Thus there is rolling instead of sliding contact between the band 4 and tire C, and consequently the latter is not worn nor otherwise appreciably injured, but wear is between the band or cylinder 4 and the body 1 of the cylinder or drum, around which the former slides and revolves. By this means the band 4 may be made to offer as high resistance as practicable without sliding on the tire.

The band 4 may be made of various materials—say of belting, hard rubber, sheet metal, or other flexible or rigid material. It is obvious it may be easily detached, and thus a new band may be quickly substituted for a worn one when required.

The upper end of the forked tube $a$ is screw-threaded exteriorly and split longitudinally, Fig. 4, thus forming a series of yielding fingers. An internally-tapered nut $a^2$ is applied to said tube, and the brake-rod $a'$ passes through it and into the tube $a$, as shown. It is apparent that by screwing the nut $a^2$ down on the tube $a$ the spring-fingers of the latter will be caused to clamp the rod $a'$ and hold it securely. It is further apparent that the rod may be easily released and again clamped in any adjustment required.

What I claim is—

1. The combination, with a bicycle-fork, of pivot-pins adapted to be attached to said fork, a wheel, and a brake for the latter, of the improved spring-support composed of a looped wire spring having its ends formed as hooks, to detachably engage the brake, and having coils that form eyes adapted to receive said pivot-pins, the closed end of the spring bearing in the crotch of the fork, as shown and described.

2. The combination, with a bicycle-fork, a wheel, and the detachable roller or drum, having radial pivot-arms, of the clamps composed of elastic bands applied to said fork, and right-angular screw-bolts whose inwardly-projecting portions constitute fulcrum-pins on which the brake-arms are pivoted, and the looped spring, having eyes for receiving said pins, and engaging the forks and roller-arms at its respective ends, as shown and described.

JULIUS LEONARD ALLEN.

Witnesses:
CHARLES O. PACKARD,
B. F. HIGGINS.